(12) United States Patent
Tanaka

(10) Patent No.: US 7,593,410 B2
(45) Date of Patent: Sep. 22, 2009

(54) SUBSTITUTION CALL CONTROL SYSTEM IN A COMMUNICATION NETWORK

(75) Inventor: Masashi Tanaka, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 772 days.

(21) Appl. No.: 11/061,725

(22) Filed: Feb. 22, 2005

(65) Prior Publication Data

US 2005/0195824 A1    Sep. 8, 2005

Related U.S. Application Data

(63) Continuation of application No. 09/324,655, filed on Jun. 3, 1999, now Pat. No. 6,859,457.

(30) Foreign Application Priority Data

Jun. 5, 1998    (JP) ............... 1998-172105

(51) Int. Cl.
*H04L 12/28* (2006.01)
*H04J 3/16* (2006.01)

(52) U.S. Cl. ............... 370/395.51; 370/420; 370/466

(58) Field of Classification Search ............... 370/395.1, 370/395.2, 395.51, 420, 389, 384, 396, 397, 370/399, 400, 419, 466, 535, 536, 465, 467
See application file for complete search history.

(56) References Cited

U.S. PATENT DOCUMENTS

| | | | |
|---|---|---|---|
| 5,734,654 A | | 3/1998 | Shirai et al. |
| 5,771,231 A | | 6/1998 | Watanabe |
| 5,864,537 A | | 1/1999 | Hijikaata et al. |
| 5,949,779 A | * | 9/1999 | Mostafa et al. ............... 370/389 |
| 5,999,514 A | | 12/1999 | Kato |
| 5,999,532 A | * | 12/1999 | Terasaki ............... 370/395.3 |
| 6,031,838 A | * | 2/2000 | Okabe et al. ............... 370/395.6 |
| 6,073,266 A | * | 6/2000 | Ahmed et al. ............... 714/749 |
| 6,111,858 A | * | 8/2000 | Greaves et al. ............... 370/256 |

(Continued)

FOREIGN PATENT DOCUMENTS

JP    09-247190    9/1997

(Continued)

OTHER PUBLICATIONS

Hee Sook Choi et al., "Locally Embedded PSA Method and Architecture of Signaling and Call/Connection Control in UNI", Information Networking, 1998. (ICOIN-12), Jan. 1998), pp. 544-547.

(Continued)

*Primary Examiner*—Hanh Nguyen
(74) *Attorney, Agent, or Firm*—Harrity & Harrity, LLP

(57) ABSTRACT

A substitution call control system includes an ATM (Asynchronous Transfer Mode) subscriber network of an ATM communication network. The ATM subscriber network includes a plurality of network terminators respectively connected with a plurality of subscriber terminals, and an ATM subscriber line concentrator, which accommodates VCs (Virtual Connection) to the plurality of network terminators, and is connected with a ATM switching apparatus of the ATM network through a UNI (User-Network Interface). The ATM subscriber line concentrator includes a substitution call control function to substitute for the plurality of network terminators and the subscriber terminals for a call control.

12 Claims, 6 Drawing Sheets

U.S. PATENT DOCUMENTS

| | | | |
|---|---|---|---|
| 6,343,083 B1 * | 1/2002 | Mendelson et al. | ......... 370/466 |
| 6,396,815 B1 | 5/2002 | Greaves et al. | |
| 6,421,345 B1 | 7/2002 | Enoki et al. | |
| 6,473,430 B2 | 10/2002 | Sreedhara et al. | |
| 6,563,835 B1 | 5/2003 | Chen | |

FOREIGN PATENT DOCUMENTS

| | | |
|---|---|---|
| JP | 10-65670 | 3/1998 |
| JP | 10-126447 | 5/1998 |
| JP | 10-207808 | 8/1998 |
| JP | 11-331238 | 11/1999 |
| WO | WO 95/30305 | 11/1995 |

OTHER PUBLICATIONS

ATM User-Network Interface (UNI), Signaling Specification, Version 4.0, af-sig-0061.00, Jul. 1996.

Man Li et al., "Simple Access Signaling for ATM-based Video-on-Demand Services", Community Network, 1995, pp. 95-100.

J. Anderson, "In Controls for Broadband Networks", Intelligent Network Workshop, 1998, pp. 361-371.

Suzuki et al., "Development of Host Digital Terminal", *Proceedings of the 1997 IEICE General Conference B-8-76*, Mar. 24-27, 1997, p. 462.

Terasaki et al., "ATM Concentration System", *Proceedings of the 1996 IEICE General Conference B-0004*, Mar. 28-31, 1996, p. 436.

Sugiyama et al., "Software of Management Operation and Information Conversion for EDI-based Customer Network Management", *Proceedings of the 1997 IEICE General Conference B-7-18*, Mar. 24-27, 1997, p. 146.

Fujita et al., "Broadband Access System", *NEC Technical Journal*, vol. 51, No. 8, Aug. 25, 1998, pp. 92-98.

* cited by examiner

| LINE NUMBER | ATM ADDRESS | CALL NUMBER | VPI | VCI |
|---|---|---|---|---|
| | | | | |
| | | | | |
| ⋮ | | | | |
| | | | | |

SUBSTITUTION CALL CONTROL SYSTEM IN A COMMUNICATION NETWORK

RELATED APPLICATION

This application is a continuation of U.S. patent application Ser. No. 09/324,655 filed Jun. 3, 1999, now U.S. Pat. No. 6,859,457 the disclosure of which is incorporated herein by reference.

BACKGROUND OF THE INVENTION

1. Field of the Invention

The present invention relates to a call control in an ATM (Asynchronous Transfer Mode) subscriber communication network. More particularly, the present invention relates to a substitution call control system which substitutes a call control from a subscriber terminal in an ATM line concentrator.

2. Description of the Related Art

There are PVC (Permanent Virtual Channel) and SVC (Switched Virtual Channel) in an ATM communication network, and the establishment and release of a SVC connection is controlled.

As protocol for the control of establishment and release of the SVC connection, the following protocols are used. That is, they are:

ITU-T recommendation Q.2110 (to be referred to as SSCOP hereinafter),

ITU-T recommendation Q.2130 (to be referred to as SSCF hereinafter),

ITU-T recommendation Q.2931 and ITU-T recommendation Q.2971,

ATM Forum Technical Committee ATM UNI (User-Network Interface) Specification Version 3.1 (to be referred to as UNI3.1 hereinafter), and ATM Forum Technical Committee ATM UNI Signaling Specification Version 4.0 (to be referred to as UNI4.0 hereinafter) with respect to a signaling layer.

FIG. 1 is a block diagram illustrating a conventional call control system of an ATM communication system. In FIG. 1, an ATM subscriber network 11 is connected with an ATM switching apparatus 20 of an ATM network 10 through a UNI (User-Network Interface) 12. The ATM subscriber network 11 is composed of an ATM subscriber line concentrator 30, and a plurality of network terminators 40a to 40c. The ATM subscriber line concentrator 30 accommodates the plurality of network terminators 40a to 40c. Each of a plurality of subscriber terminals 50a to 50c is connected with a corresponding one of the network terminators 40a to 40c.

In the conventional call control system, a call control function 100a is installed in the ATM switching apparatus 20 of the ATM network 10. Call control functions 100b and 10c are installed in each of the ATM subscriber line concentrator 30 and the network terminators 40a to 40c in the ATM subscriber network 11. Also, call control functions 100d are installed in the subscriber terminals 50a to 50c. Thus, the flexibility and effective usage of the allocation of network resources in the ATM network 10 and the ATM subscriber network 11 are intended.

FIG. 2 is a diagram illustrating protocols used to realize the conventional call control functions 100a to 100d shown in FIG. 1. In FIG. 2, the ATM switching apparatus 20 in the ATM network 10 is composed of a SDH layer 110a, an ATM layer 111a, an AAL5 layer 112a, an SSCOP layer 113a, an SSCF layer 114a, a signaling layer 115a and an ATM switching apparatus application 130.

The ATM subscriber line concentrator 30 has two layer structures and an ATM subscriber line concentrator application 140. One of the two layer structures is composed of a SDH layer 110b, an ATM layer 111b, an AAL5 layer 112b, an SSCOP layer 113b, an SSCF layer 114b, a signaling layer 115b, and the other is composed of a SDH layer 110c, an ATM layer 111c, an AAL5 layer 112c, an SSCOP layer 113c, an SSCF layer 114c, a signaling layer 115c.

Each of the network terminators 40a to 40c has two layer structures and a network terminator application 150. One of the two layer structures is composed of a SDH layer 110d, an ATM layer 111d, an AAL5 layer 112d, an SSCOP layer 113d, an SSCF layer 114d, a signaling layer 115d, and the other is composed of a SDH layer 110e, an ATM layer 111e, an AAL5 layer 112e, an SSCOP layer 113e, an SSCF layer 114e, a signaling layer 115e.

Each of the subscriber terminals 50a to 50c is composed of a SDH layer 110f, an ATM layer 111f, an AAL5 layer 112f, an SSCOP layer 113f, an SSCF layer 114f, a signaling layer 115f and a subscriber-terminal application 160.

As described above, the protocol of each of the call control functions 100a to 100d is composed of:

the physical layer (SDH: Synchronous Digital Hierarchy) 110a to 110f, the ATM layer 111a to 111f defined by ITU-T recommendation I.361, the AAL5 layer (AAL: ATM Adaptation Layer) 112a to 112f defined by ITU-T recommendation I.363, the SSCOP layer 113a to 113f defined by ITU-T recommendation Q.2110, the SSCF layer 114a to 114f defined by ITU-T recommendation Q.2130, and the signaling layer 115a to 115f for executing a call control.

The ATM switching apparatus 20 is provided with an ATM switching apparatus application 130 which controls the call control protocol. The ATM subscriber line concentrator 30 is provided with an ATM subscriber line concentrator application 140 which controls the call control protocol. Each of the network terminators 40a to 40c is provided with a network terminator application 150 and each of the subscriber terminals 50a to 50c is provided with a subscriber terminal application 160.

Next, the operations of the call control functions shown in FIG. 1 will be described.

A call control procedure is executed between the call control functions 10a of the ATM switching apparatus 20 and the call control function 100b of the ATM subscriber line concentrator 30 through a channel 210a of VPI (Virtual Path Identifier)/VCI (Virtual Channel Identifier)=VP identifier/VC identifier=0/5 defined in UNI 3.1 by UNI 12. Thus, the establishment and release of a SVC connection 200a between the ATM switching apparatus 20 and the ATM subscriber line concentrator 30 is controlled.

A call control procedure is executed between the call control function 100b of the ATM subscriber line concentrator 30 and the call control function 10c of the network terminator (40: any of 40a to 40c), using an optional PVC (Permanent Virtual Channel) connection channel 210b as a call control channel. Thus, the establishment and release of the SVC connection 200b is controlled between the ATM subscriber line concentrator 30 and the network terminator 40.

A call control procedure is executed between the call control function 100c of the network terminator 40 and the call control function 100d of the subscriber terminal (50: any of 50a to 50c), using an optional PVC connection channel 210c as a call control channel. Thus, the establishment and release of the SVC connection 200c is controlled between the network terminator 40 and the subscriber terminal 50.

However, there are the following problems in the conventional call control function described above.

The first problem is in that the network terminators 40a to 40c, and the subscriber terminal 50a to 50c are expensive in price. This is because the call control function is installed into each of the ATM subscriber line concentrator 30, the network terminators 40a to 40c, and the subscriber terminal 50a to 50c. Because the call control functions are different depending upon the units, the development cost increases. Also, because the memory capacity is needed for the call control function, each apparatus becomes expensive. As a result, the investment to ATM subscriber network 11 increases.

In the second problem, the maintenance when the specification of the call control function is updated takes time and effort. This is because the call control functions are installed in the ATM subscriber line concentrator 30, the network terminators 40a to 40c, and the subscriber terminal 50a to 50c. In case of the update of the specification of the call control function, a software of the call control function of each of the ATM subscriber line concentrators 30, the network terminators 40a to 40c, and the subscriber terminal 50a to 50c must be updated.

In the third problem, the throughputs of the network terminators 40a to 40c, and the subscriber terminal 50a to 50c are decreased. This is because the SSCOP layer contained in the call control protocol needs to transmit and receive an SSCOP layer control ATM cell in the unit of several seconds for the establishment and maintenance of connection in a link layer.

Also, in a substitution call control procedure which is proposed as a proxy signaling agent (to be referred to as PSA hereinafter) in UNI 4.0 (ATM Forum Technical Committee ATM UNI Signaling Specification Version 4.0), there are two problems. That is, they are where an agent of the substitution call control should be installed in the system, and a communication system between the substitution call control agent and the application of the apparatus is not defined.

In conjunction with the above description, an ATM line concentrator is described in Japanese Laid Open Patent application (JP-A-Heisei 10-65670). In this reference, transmission path terminating circuit (16) to (18), an ATM switch (19), and a signaling terminating circuit (20) are provided. Information for executing signaling is transmitted through the transmission path terminating circuits (16) to (18) using the ATM switch (19) and the signaling terminating circuit (20). The signaling is a procedure to establish a virtual connection channel between the ATM exchanger (1) and one of the subscriber terminals (5) to (8). At this time, the transmission path terminating circuit (16) terminates a physical transmission path (9) which is accommodated by the ATM exchanger (1). Also, the transmission path terminating circuits (17) and (18) terminate physical transmission paths (10) and (11) which are respectively accommodated by the ATM multiplexers (3) and (4) connected to the subscriber terminals (5) to (8), for separating and multiplexing information. Thus, a wide band service can be effectively provided.

SUMMARY OF THE INVENTION

An object of the present invention is to provide a substitution call control system in which a network terminator and a subscriber terminal are provided with low costs, so that an ATM subscriber network can be constructed in a low cost.

Another object of the present invention is to provide a substitution call control system including an ATM subscriber network in which maintainability of a call control function can be improved.

Still another object of the present invention is to provide a communication system which can be constructed easily as a communication system between a substitution call control function and an application.

One aspect is directed to a call control system including an ATM (Asynchronous Transfer Mode) communication network, the system includes a plurality of network terminators respectively connected with a plurality of subscriber terminals. Additionally, the system includes an ATM subscriber line concentrator configured to form VCs (Virtual Connection) with the plurality of network terminators and coupled to an ATM switching apparatus of the ATM network through a UNI (User-Network Interface). The ATM subscriber line concentrator performs a protocol conversion between an ATM protocol used between the ATM subscriber line concentrator and the ATM switching apparatus and a non-ATM protocol used between the ATM subscriber line concentrator and the plurality of network terminators.

Yet another aspect is directed to an ATM subscriber line concentrator including a first communication layer structure, a second communication layer structure, and a substitution control component. The first communication layer structure communicates with an ATM switching apparatus using an ATM protocol. The second communication layer structure communicates with a plurality of network terminators respectively coupled to a plurality of subscriber terminals using a non-ATM protocol. The substitution control component performs a protocol conversion between the ATM protocol used by the first communication layer structure and the non-ATM protocol used by the second communication layer structure.

Yet another aspect is directed to a method of coupling an ATM switching apparatus and an ATM subscriber line concentrator to network terminators and subscriber terminals in an ATM network. The method includes communicating using an ATM protocol between the ATM switching apparatus and the ATM subscriber line concentrator; converting between the ATM protocol and a non-ATM protocol at the ATM subscriber line concentrator; and communicating between the network terminators and the subscriber terminals using the non-ATM protocol.

DESCRIPTION OF THE PREFERRED EMBODIMENTS

A substitution call control system in an ATM communication apparatus of the present invention will be described below in detail with reference to the attached drawings.

Figures 3, 4:
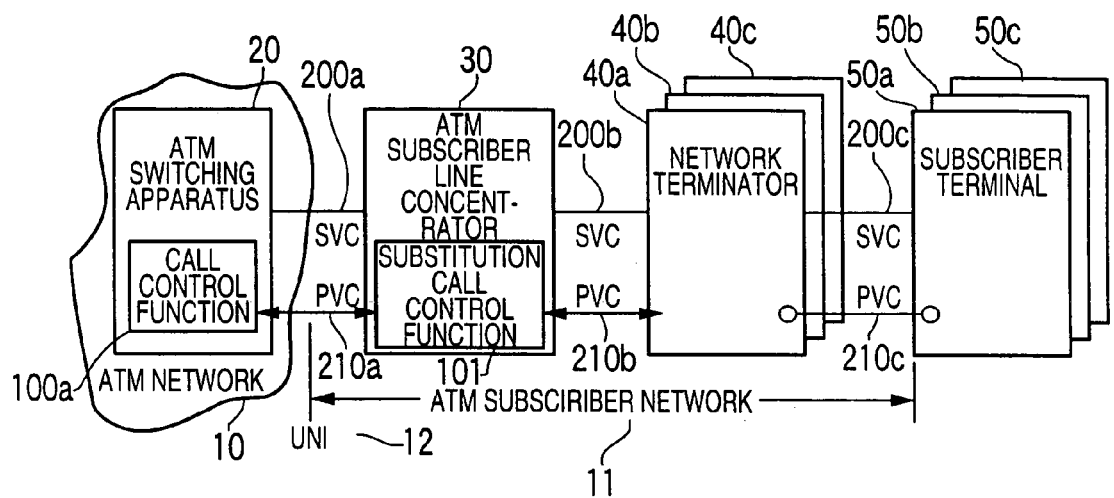
FIG. 3 is a block diagram illustrating the structure of a substitution call control system according to a first embodiment of the present invention.
FIG. 4 is a diagram illustrating a management table used in the substitution call control system according to the first embodiment of the present invention.

FIG. 3 is a block diagram illustrating the call control system of an ATM communication apparatus of the present invention. In FIG. 3, an ATM subscriber network 11 is connected with an ATM switching apparatus 20 of an ATM network 10 through a UNI (User-Network Interface) 12. The ATM subscriber network 11 is composed of an ATM subscriber line concentrator 30, and a plurality of network terminators 40a to 40c. The ATM subscriber line concentrator 30 accommodates the plurality of network terminators 40a to 40c. Each of a plurality of subscriber terminals 50a to 50c is connected with a corresponding one of the network terminators 40a to 40c.

In the substitution call control system, a call control function 100a is installed in the ATM switching apparatus 20 of the ATM network 10. A substitution call control function 101 is installed in the ATM subscriber line concentrator 30 in the ATM subscriber network 11. The substitution call control function is proposed in UNI 4.0. The network terminators 40a to 40c in FIG. 3 are not provided with any call control function, unlike the conventional network terminators shown in FIG. 1. Also, the subscriber terminals 50a to 50c in FIG. 3 are not provided with any call control function, unlike the subscriber terminals shown in FIG. 1.

When a given one of the subscriber terminals 50a to 50c issues a call processing request to the ATM subscriber line concentrator 30 through a corresponding one of the plurality of network terminators 40a to 40c, a line number connected to the given subscriber terminal and an ATM address of the given network terminator or subscriber terminal are held.

Also, when one of the plurality of subscriber terminals issues a call processing request to the ATM subscriber line concentrator through a corresponding one of the plurality of network terminators, it is preferable that a call number is held.

In addition, when a SVC (Switched Virtual Channel) connection is established in response to a call processing request issued from one of the plurality of subscriber terminals to the ATM subscriber line concentrator through a corresponding one of the plurality of network terminators, a VPI (Virtual Path Identifier) value and a VCI (Virtual Channel Identifier) value of the SVC connection are held. That is, the substitution call control function holds VPI/VCI values of a SVC connection when the SVC connection is established based on an ATM address for identifying another subscriber terminal, a line number to which the other subscriber terminal is connected, and a request of SVC connection establishment/release control.

Also, the network terminators or the subscriber terminal is subjected to IETF (Internet Engineering Task Force) RFC (Request For Comment)1577, classical IP (Internet Protocol) and ARP over ATM (to be referred to as IPOA hereinafter) and contains RFC793, TCP/RFC791, IP or RFC768 UDP/IP protocol, as to the protocol for the message transmission and reception for requesting the control establishment and release of the SVC connection to the substitution call control function of the ATM subscriber line concentrator.

Moreover, the network terminators or the subscriber terminal contains x DSL (Digital Subscriber Line, and including Asymmetric DSL, High-bit-rate DSL, Rate-Adaptive DSL, Symmetric DSL, and Very-high-bit-rate DSL) which is being standardized in ADSL Forum as a system for mapping to an ATM cell a message for requesting the control of establishment and release of a SVC connection to the substitution call control function of the ATM subscriber line concentrator.

In the present invention, any existing protocol and a communication system are used for the message for requesting the control of the establishment and release of the SVC connection between the substitution call control function of the ATM subscriber line concentrator and an application of the network terminator and the subscriber terminal. For this reason, it is possible to use the SVC connection between the ATM network and the ATM subscriber network through the substitution call control function, when a substitution call control procedure and a substitution call control message are determined between the substitution call control function and the application of each unit.

Also, in the present, a management table is provided such that the substitution call control function can manage ATM addresses of the network terminators and the subscriber terminals and SVC connections in the ATM network. Therefore, it is possible to develop the application without being conscious of the call control function in the network terminator and the subscriber terminal.

A channel 210a (VPI/VPC=0/5), which is defined in UNI 3.1, is provided between the ATM subscriber line concentrator 30 and the ATM switching apparatus 20, for transmission and reception of a call control message defined by UNI 3.1 of ATM Forum. The ATM subscriber line concentrator 30 is provided with the substitution call control function 101 to control SVC connections 200b and 200c in the ATM subscriber network 11. The substitution call control function 101, the network terminators 40a to 40c and the subscriber terminals 50a to 50c establish PVC connections 210b and 210c to transmit and receive a substitution call control message.

FIG. 4 is a diagram illustrating the management table 300 of the substitution call control function 101 shown in FIG. 3. The data stored in the management table 300 is composed of a line number 301, an ATM address 302, a call number 303, a VPI value 304, and a VCI value 305. The line number 301 indicates the number of a line to which each subscriber terminal 50 accommodated in the ATM subscriber line concentrator 30 is connected. The ATM address 302 is an address of the network terminator 40 or the subscriber terminal 50. The call number 303 is allocated when the substitution call control function 101 transmits and receives a call control message to and from the ATM switching apparatus 20 instead of the subscriber terminal 50. The VPI 304 and VCI 305 values are allocated when the substitution call control function 101 transmits and receives the call control message to and from the ATM switching apparatus 20 instead of the subscriber terminals 50a to 50c.

Figure 5:
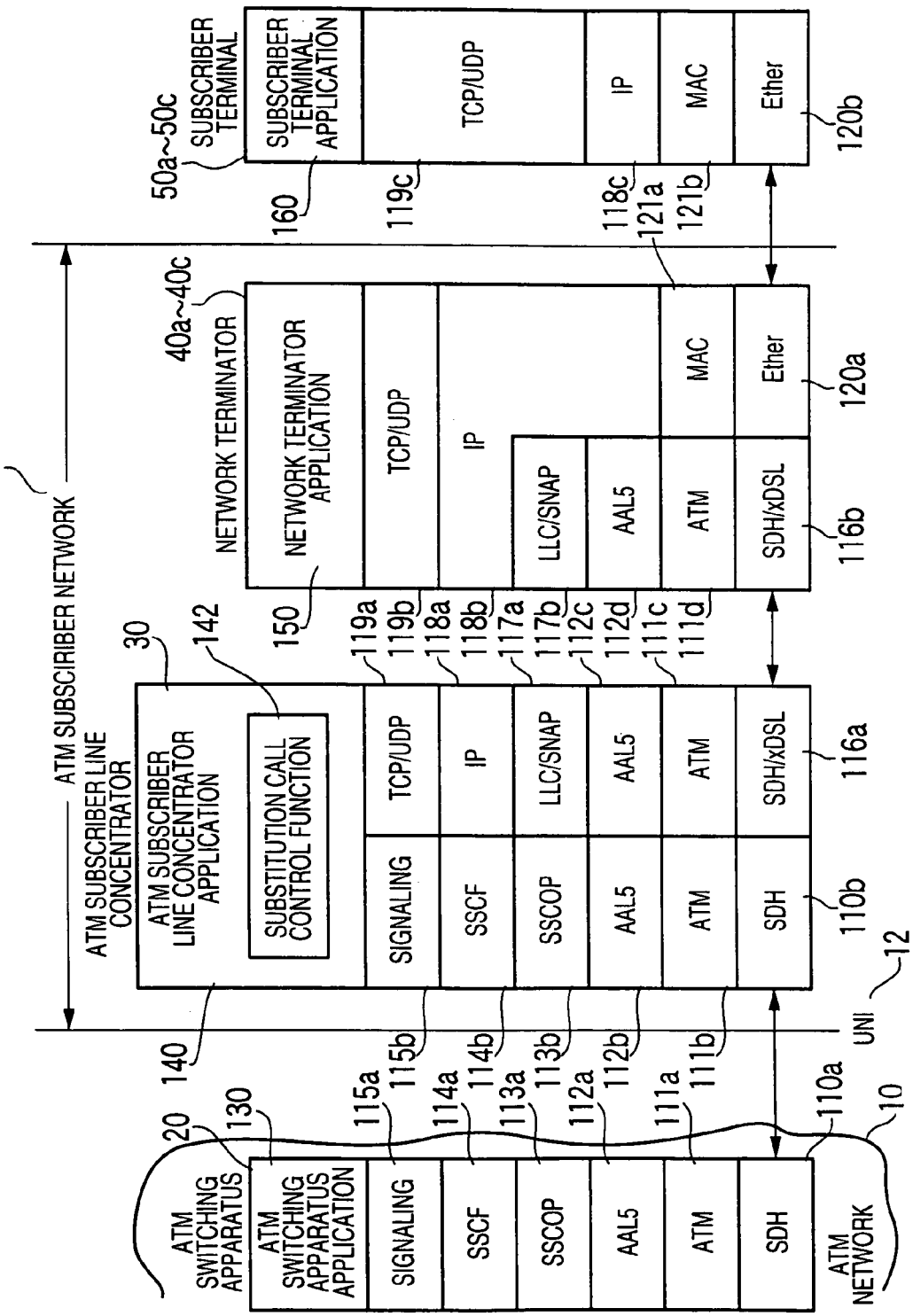
FIG. 5 is a diagram illustrating an example of protocols used in the substitution call control system according to the first embodiment of the present invention.

FIG. 5 is a diagram illustrating protocols in the first embodiment of the present invention when there is mapped to a TCP/UDP layer, a substitution call control message which is transmitted or received between the substitution call control function 101 and the network terminators 40a to 40c or the subscriber terminal 50a to 50c. The address for the network terminator 40 is registered as the ATM address 302 of the management table 300.

Figure 1:
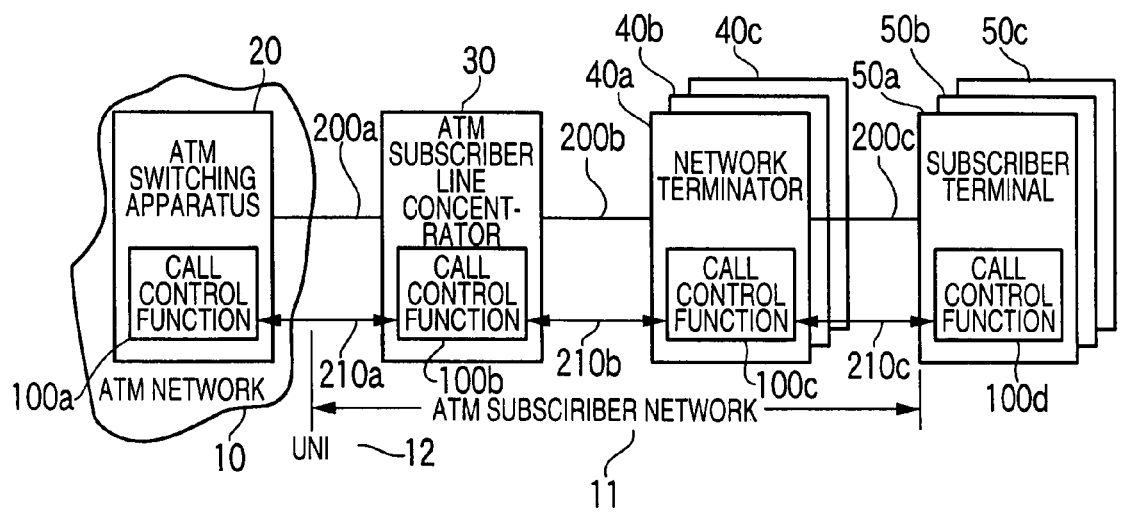
FIG. 1 is a block diagram illustrating a conventional ATM communication apparatus.
Figure 2:
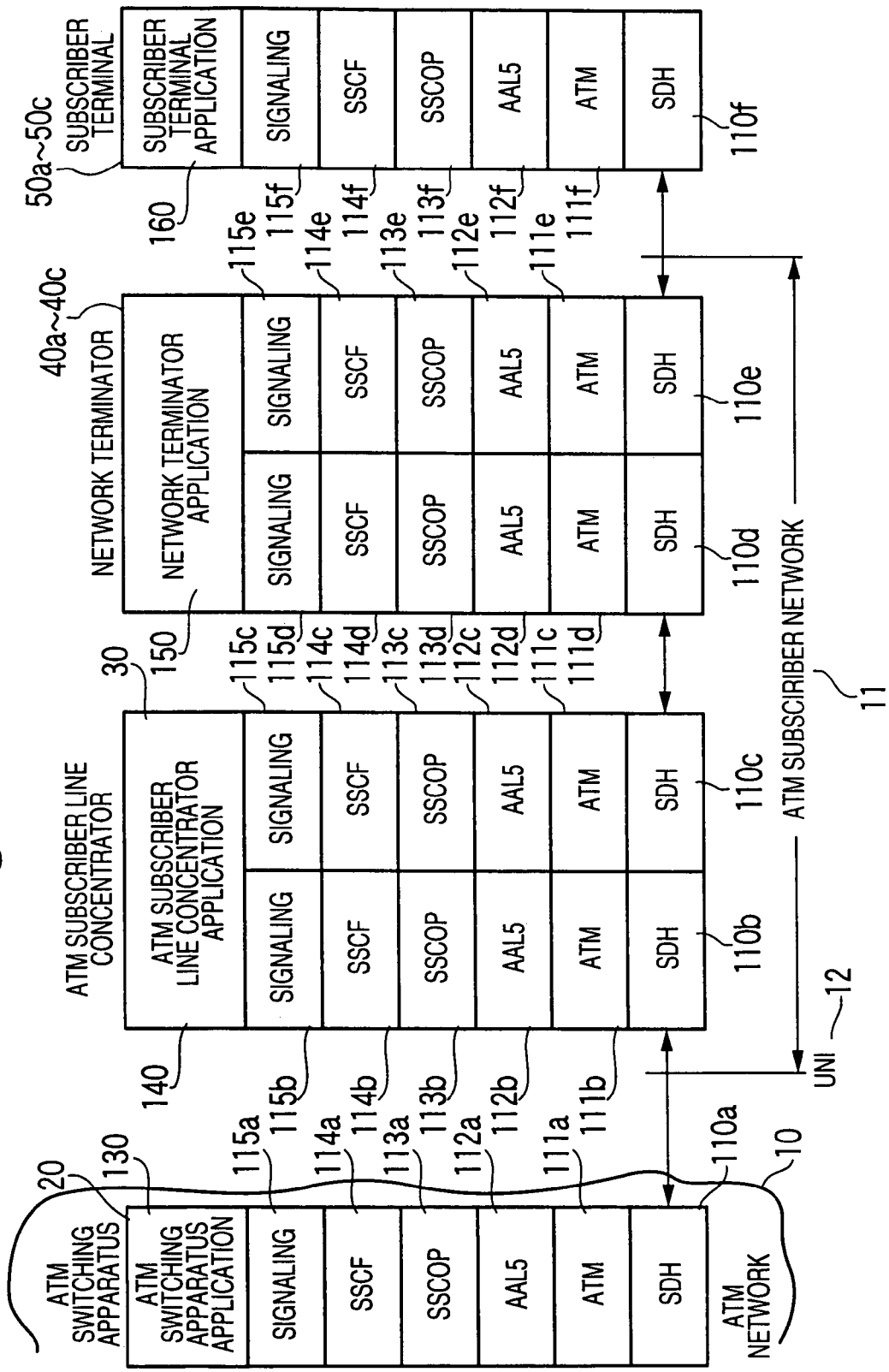
FIG. 2 is a diagram illustrating an example of protocols for call control functions in the conventional ATM communication apparatus shown in FIG. 1.

In the UNI 12 between the ATM switching apparatus 20 of the ATM network 10 and the ATM subscriber line concentrator 30 of the ATM subscriber network 11, SDH (Synchronous Digital Hierarchy) layers 110a and 110b, ATM layers 111a and 111b subject to ITU-T recommendation I.361, AAL5 layers 112a and 112b subject to ITU-T recommendation I.363, SSCOP (Service Specific Connection Oriented Protocol) layers 113a and 113b subject to ITU-T recommendation Q. 2110, SSCF (Service Specific Coordination Function) layers 114a and 114b subject to ITU-T recommendation Q. 2130, and signaling layers 115a and 115b (containing ITU-T recommendation Q2931, ITU-T Q2971, UNI 3.1, and UNI 4.0) are provided as the call control protocol, like the conventional apparatus shown in FIG. 1. The layers are controlled by the ATM switching apparatus application 130 and the ATM subscriber line concentrator application 140.

The ATM subscriber line concentrator application 140 is provided with the substitution call control function 101 and the network terminators application 150. A substitution call control protocol between the ATM subscriber line concentrator application 140 and the network terminator application 150 include:

SDH/xSDL layers 116a and 116b,

ATM layers 111c and 111d,

AAL5 layers 112c and 112d,

IEEE802.2 LLC/SNAP layers 117a and 117b,

IP layers 118a and 118b, and

TPC/UPD layers 119a and 119b.

The substitution call control protocol is used to transmit and receive the substitution call control message. When the SDH layer is provided, the system is the IPOA system, and when the xDSL layer is provided, the system uses the xDSL over ATM communication system and the IPOA system.

A substitution call control protocol between the network terminators application 150 and the subscriber terminal application 160 includes:

IEEE802.3 Ether layers 120a and 120b,

IEEE802.5 MAC (Media Access Control) layers 121a and 121b,

IP layers 118b and 118c, and

TPC/UDP layers 119b and 119c.

The substitution call control protocol is used to transmit and receive the substitution call control message.

Figure 6:
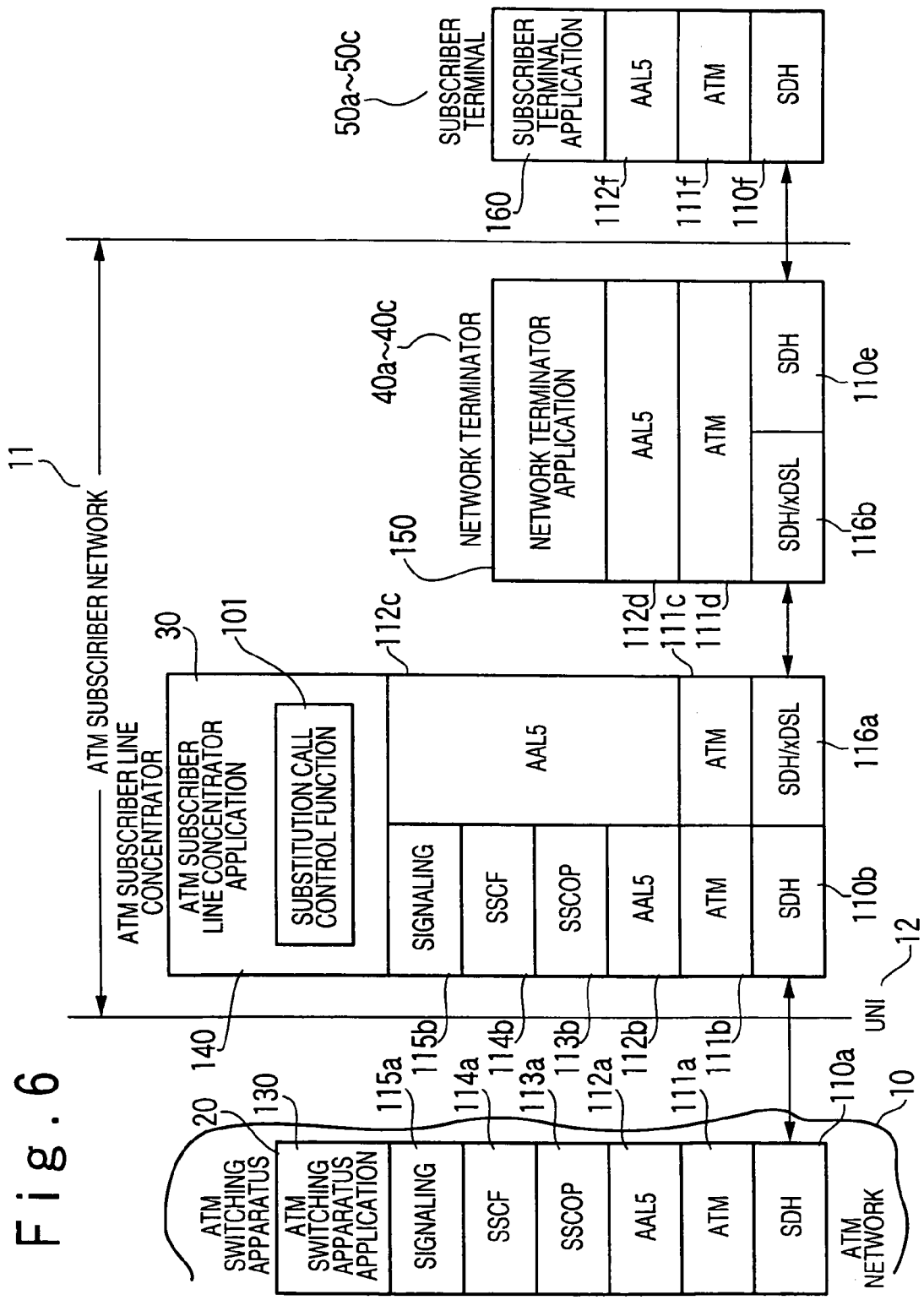
FIG. 6 is a diagram format illustrating another example of the protocol of the substitution call control system according to a second embodiment of the present invention.

FIG. 6 is a diagram is illustrating the protocol in the second embodiment of the present invention when the substitution call control message transmitted and received between the substitution call control function 101 and the network terminators 40a to 40c or the subscriber terminal 50a to 50c is mapped to an ATM cell.

The UNI 12 between the ATM switching apparatus 20 and the ATM subscriber line concentrator 50 includes:

SDH layers 110a and 110b,

ATM layers 111a and 111b,

AAL5 layers 112a and 112b,

SSCOP layers 113a and 113b,

SSCF layers 114a and 114b, and signaling layers 115a and 115b as the call control protocol, like the case of FIG. 5. The UNI 12 is controlled by ATM switching apparatus application 130 and the ATM subscriber line concentrator application 140 with the substitution call control function 101.

The ATM subscriber line concentrator application 140 which is provided with the substitution call control function 101, and the network terminators application 150. The substitution call control protocol between the ATM subscriber line concentrator application 140 and the network terminator application 150 includes:

SDH/xDSL layers 116a and 116b,

ATM layers 111c and 111d, and

AAL layers 112c and 112d.

The substitution call control protocol is used to transmit and receive the substitution call control message. When the xDSL layer is provided, the system uses the xDSL over ATM communication system.

A substitution call control protocol between the network terminators application 150 and terminal application 160 includes:

SDH layers 10e and 110f,

ATM layers 111d and 111f, and

AAL5 layers 112d and 112f.

The substitution call control protocol is used to transmit and receive the substitution call control message.

The ATM network 10 determine the format of the substitution call control message to be transmitted and received between the substitution call control function 101 of the ATM subscriber line concentrator application 140 and the network terminators application 150 and the subscriber terminal application 160, to operate the substitution call control function.

Also, it is determined whether the system of the substitution call control message should be mapped to the TCP/UDP layer shown in FIG. 5 or the ATM cell shown in FIG. 6, and the ATM subscriber network 11 of FIG. 3 is built up.

Further, the line number 301 of the subscriber terminal 50 and the ATM address 302 as the ATM address of the network terminator 40 or the subscriber terminal 50 is set in the management table 300 which is managed by the substitution call control function 101 of the ATM subscriber line concentrator 30.

Next, the operation of the SVC connection establishment and release control in the ATM network 10 and the ATM subscriber network 11 in FIG. 3 will be described.

The ATM switching apparatus application 130 and ATM subscriber line concentrator application 140 execute a standard call control procedure through the call control channel 210a (VPI/VCI=0/5) between the ATM switching apparatus 20 and the ATM subscriber line concentrator 30 to establish the SVC connection 200a (VPI/VCY=X/Y).

In the SVC connections 200b and 200c between the ATM subscriber line concentrator 30 and the network terminator (40: 40a to 40c) and the network terminators 40 and the subscriber terminal (50: 50a to 50c), the VPI/VCI=X/Y values of the SVC connection 200a between the ATM switching apparatus 20 and the ATM subscriber line concentrator 30 are set to a predetermined substitution call control message. These values are informed to the network terminator application 150 of the network terminator 40 and the subscriber terminal application 160 of the subscriber terminal 50 through the PVC connections 210b and 210c (VPI/VCI=0/5, for example) by a predetermined substitution call control procedure, such that the VPI/VCI=X/Y values of the SVC connections 200b and 200c are set.

The call number when the call control procedure with ATM switching apparatus 20 is executed is stored in the call number column 303 of the management table 300 managed by the substitution call control function 101.

Also, the value X of the VPI and the value Y of the VCI of the SVC connection 200a which has been established between the ATM switching apparatus 20 and the ATM subscriber line concentrator 30 are set in the VPI column 304 and VCI column 305 of the management table 300 managed by the substitution call control function 101. Thus, the management table 300 is updated.

The ATM switching apparatus application 130 and the ATM subscriber line concentrator application 140 execute the standard call control procedure between the ATM switching apparatus 20 and the ATM subscriber line concentrator 30 to releases the SVC connection 200a (VPI/VCY-=X/Y).

In the SVC connections 200b and 200c between the ATM subscriber line concentrator 30 and the network terminator 40 and between the network terminator 40 and the subscriber terminal 50, when the SVC connection 200a (VPI/VCI=X/Y) between the ATM switching apparatus 20 and the ATM subscriber line concentrator 30 is released by the standard call control procedure through the call control channel 210a (VPI/VCI=0/5, for example), the VPI value of X and the VCI value of Y of the released SVC connection 200a are set to the predetermined substitution call control message and are notified to the network terminator application 150 of the network terminators 40 and the subscriber terminal application 160 of the subscriber terminal 50 through the PVC connections 210b and 210c (VPI/VCI=0/5) by the predetermined substitution call control procedure. Thus, the VPI/VCI=X/Y value of the SVC connections 200b and 200c are released.

In conjunction with the release of the SVC connections 200b and 200c, the contents of the management table 300 managed by the substitution call control function 101 are updated. That is, the call number 303 of the released SVC connection 200a when the call control procedure with the ATM switching apparatus 20 is executed is deleted. Also, data of the same row as the call number in the columns of VPI 304 and VCI 305 are deleted.

Figure 7:
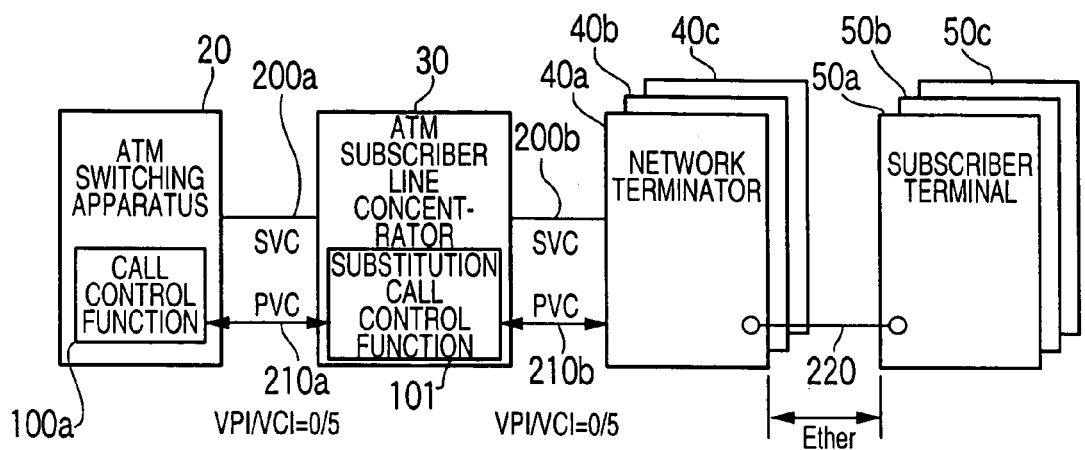
FIG. 7 is a block diagram illustrating the logical channel structure of an ATM subscriber network when the protocols of FIG. 5 are used for the substitution call control system in the ATM subscriber network of the present invention.

FIG. 7 is a block diagram illustrating the structure of the logical channel of the ATM subscriber network 11 when the protocol shown in FIG. 5 is used for the substitution call control system in the ATM subscriber network 11 of the present invention. In this case, an ATM address allocated to the network terminator is registered in the management table 300. The call control procedure is executed between the ATM switching apparatus 20 and the ATM subscriber line concentrator 30 through call control channel 210a (VPI/VCI=0/5) which is the PVC connection defined in UNI 3.1, and the establishment and release of the SVC connections 200a between the ATM switching apparatus 20 and the ATM subscriber line concentrator 30 is controlled.

The predetermined substitution call control procedure is executed between the ATM subscriber line concentrator 30 and the network terminator 40, using the call control channel 210b (VPI/VCI=0/5) (the values of VPI/VCI are same as those of the channel 210a) which is the PVC connection defined in UNI 3.1, and the establishment and release of the SVC connection 200b between the ATM subscriber line concentrator 30 and the network terminators 40a to 40c are controlled.

The network terminators 40 and the subscriber terminal 50 are connected by an ether net 220 so that the predetermined substitution call control procedure is executed. A connection corresponding to the SVC connections 200a or 200b between the ATM switching apparatus 20 and the ATM subscriber line concentrator 30 or between the ATM subscriber line concentrator 30 and the network terminators 40 is established and released on the ether net 220.

Figure 8:
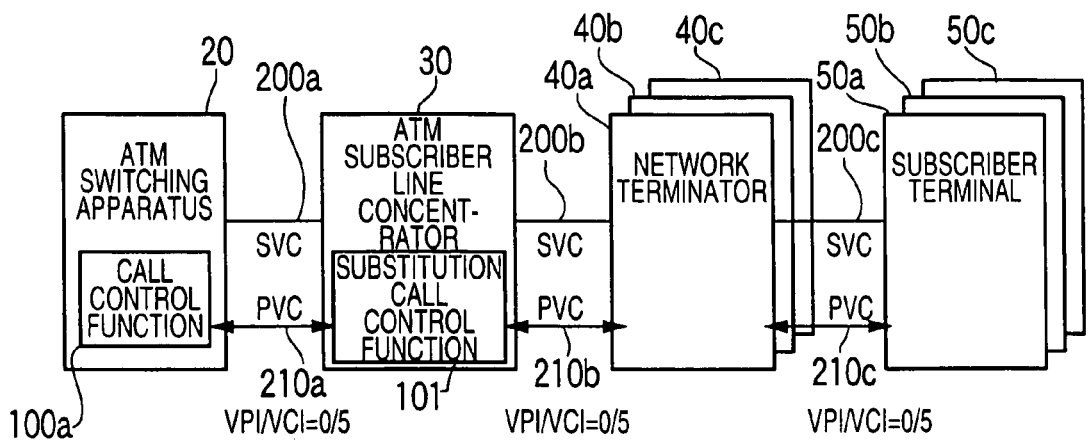
FIG. 8 is a block diagram illustrating the logical channel structure of the ATM subscriber network when the protocols of FIG. 6 are used for the substitution call control function in the ATM subscriber network of the present invention.

FIG. 8 is a block diagram illustrating the structure of the logical channel of the ATM subscriber network 11 when the protocol shown in FIG. 6 is used to the substitution call control system of the present invention in the ATM subscriber network 11. In this case, an ATM address of the subscriber terminal is registered in the management table 300.

The call control procedure is executed between the ATM switching apparatus 20 and the ATM subscriber line concentrator 30 through the call control channel 210a (VPI/VCI=0/5) which is the PVC connection defined in UNI 3.1, and the establishment and release of the SVC connection 200a between the ATM switching apparatus 20 and the ATM subscriber line concentrator 30 is controlled.

The predetermined substitution call control procedure is executed between the ATM subscriber line concentrator 30 and the network terminator 40, using the call control channel 210b (VPI/VCI=0/5, recommended as an example) (the values of VPI/VCI are the same as those of the channel 210a), and the establishment and release of the SVC connection 200b between the ATM subscriber line concentrator 30 and the network terminator 40 are controlled.

Also, the predetermined substitution call control procedure is executed between the network terminator 40 and the subscriber terminal 50, using the call control channel 210c (VPI/VCI=0/5, recommended as the example) (the values of VPI/VCI are the same as those of the channel 210a), and the establishment and release of the SVC connection 200c between the network terminator 40 and the subscriber terminal 50 are controlled.

As described above, according to the present invention, a network terminator and a subscriber terminal can be provided in a low cost. This is because in the ATM subscriber network 11, the substitution call control function 101 is installed only in the ATM subscriber line concentrator 30, and it is not necessity to install the standard call control function in the network terminators and the subscriber terminals. Therefore, the development expenses of the call control function for these units becomes unnecessary, and the memory quantity for these call control functions can be reduced.

As the communication system between the subscriber terminal and the network terminator, the existing protocol is used for the substitution call control function. Therefore, if the substitution call control procedure and the substitution call control message format are defined, the substitution call control function is possible to be used.

It is possible to reduce the investment expense for the ATM subscriber network. This is because the number of network terminators and the subscriber terminals contained in the ATM subscriber network is enormous. Because these unit prices are low so that the price reduction can be attained as the whole ATM subscriber network.

Also, the maintenance of the ATM subscriber network becomes easy. This is, only the ATM subscriber line concentrator needs to be maintained for the call control protocol of the ATM network.

Also, even in the subscriber terminal in which an adapter for the Ethernet is installed, it is possible to easily use the SVC connection of the ATM network. In the ATM subscriber line concentrator and the subscriber terminal, it is sufficient to install a simple dedicated driver for the substitution call control function procedure because the substitution call control message is mapped onto the TPC/IP communication and the UDP/IP communication.

What is claimed is:

1. A call control system in a communication network, the system comprising:

a plurality of network terminators to respectively connect to a plurality of subscriber terminals; and a subscriber line concentrator to establish and terminate, using a call control function, VCs (Virtual Connections) with the plurality of network terminators and couple to a switching apparatus of the network through a UNI (User-Network Interface), where the subscriber line concentrator performs a protocol conversion between a first protocol stack used between the subscriber line concentrator and the switching apparatus and a second protocol stack used between the subscriber line concentrator and the plurality of network terminators, where the plurality of network terminators performs a protocol conversion between the second protocol stack and a third protocol stack used between the plurality of network terminators and the plurality of subscriber terminals, where the first protocol stack differs from the second protocol stack and the second protocol stack differs from the third protocol stack, and where at least one layer of the first, second, and third protocol stacks uses a same protocol.

2. The system of claim 1, where the at least one layer comprises two or more different layers.

3. The system of claim 1, where the plurality of network terminators and the plurality of subscriber terminals are connected by a PVC (permanent virtual circuit).

4. The system of claim 1, where the subscriber line concentrator and the plurality of network terminators are connected by a PVC (permanent virtual circuit).

5. The system of claim 4, where a virtual path identifier (VPI)/virtual channel identifier (VCI) value of the permanent virtual circuit is 0/5.

6. The system of claim 1, where the subscriber line concentrator communicates with the plurality of network terminators and the plurality of subscriber terminals using a substitute call control message that is transmitted and received using the second protocol stack.

7. The system of claim 6, where the substitute call control message is transmitted and received with subscriber data.

8. The system of claim 6, where the substitute call control message is transmitted and received via an IP (Internet Protocol) and an ARP (Address Resolution Protocol) over ATM (asynchronous transfer mode).

9. The system of claim 6, where the substitute call control message is transmitted and received by a DSL (Digital Subscriber Line) over ATM (asynchronous transfer mode).

10. The system of claim 1, where the plurality of network terminators and the plurality of subscriber terminals are not provided with call control functions.

11. A method of coupling a network switching apparatus and a subscriber line concentrator to network terminators and subscriber terminals in a subscriber communication network, the method comprising:

communicating, using a first protocol stack, between the network switching apparatus and the subscriber line concentrator;

converting between the first protocol stack and a second protocol stack at the subscriber line concentrator;

communicating, using the second protocol stack, between the network terminators and the subscriber line concentrator, where the first protocol stack and the second protocol stack differ;

converting between the second protocol stack and a third protocol stack at the subscriber network terminators, where the second protocol stack differs from the third protocol stack; and communicating, using the third protocol stack, between the network terminators and the subscriber terminals, where at least one layer of the first, second, and third protocol stacks uses a same protocol.

12. The method of claim 11, where the network terminators and the subscriber terminals do not have call control functions.

* * * * *